United States Patent [19]

Nakamura et al.

[11] Patent Number: 5,422,819
[45] Date of Patent: Jun. 6, 1995

[54] IMAGE DATA PROCESSING SYSTEM FOR SEWING MACHINE

[75] Inventors: Takashi Nakamura; Takeshi Kongho, both of Tokyo, Japan

[73] Assignee: Janome Sewing Machine Co., Ltd., Tokyo, Japan

[21] Appl. No.: 837,802

[22] Filed: Feb. 18, 1992

[30] Foreign Application Priority Data

Feb. 22, 1991 [JP] Japan .................. 3-048634
Feb. 22, 1991 [JP] Japan .................. 3-048635
Feb. 22, 1991 [JP] Japan .................. 3-048637

[51] Int. Cl.⁶ ......................................... G06F 15/46
[52] U.S. Cl. ........................................... 364/470
[58] Field of Search ............... 340/825.79; 358/448, 358/452, 463, 474, 467, 486; 395/114, 115, 118, 128, 129, 131, 141, 142, 164, 275; 364/470

[56] References Cited

U.S. PATENT DOCUMENTS

| | | | |
|---|---|---|---|
| 3,722,434 | 3/1973 | Strother et al. | 112/79 |
| 4,389,677 | 6/1983 | Rushby et al. | 358/280 |
| 4,475,784 | 10/1984 | Lukawich | 339/43 |
| 4,777,651 | 10/1988 | McCann et al. | 382/21 |
| 4,807,143 | 2/1989 | Matsuura | 364/468 |
| 5,016,183 | 5/1991 | Shyong | 364/470 |
| 5,239,383 | 8/1993 | Ikeda et al. | 358/300 |

*Primary Examiner*—Robert W. Beausoliel, Jr.
*Assistant Examiner*—Stephen C. Elmore
*Attorney, Agent, or Firm*—Westman, Champlin & Kelly

[57] ABSTRACT

An image data processing system for a sewing machine wherein data processing is performed after reading an original image pattern to be embroidered by the use of an image input device and producing image data. The image data is subjected to data processing such as noise removal, data compression and data addition. In the present invention, noise removal is performed by referencing surrounding bits of an extracted check bit, and if the surrounding bits are the same color, converting the check bit data to this same color. Data compression is performed by assigning the color of a bit representative of a bit group as either black or white in consideration of the degree of black or white of the original image data and the bit group. Also, if portions of the original image are thinner than a predetermined line width, image processing will automatically correct the image so all portions correspond with an appropriate line width.

4 Claims, 14 Drawing Sheets

"NUMBER OF COMPRESSION REFERENCE BITS" = 4

"NUMBER OF COMPRESSION REFERENCE BITS" = 3

IMAGE DATA PROCESSING SYSTEM FOR SEWING MACHINE

BACKGROUND OF THE INVENTION

1. Field of the Invention

The present invention is related to an image data processing system for a sewing machine, and particularly to an image data processing system for a sewing machine wherein an original pattern to be embroidered is read from an image input device to produce image data, and thereafter the image data is subjected to data processing such as noise removal, data compression and data addition.

2. Description of the Prior art

In a data storage system which has been disclosed in U.S. Pat. No. 3,722,434, a replica of a desired pattern is optically read by a scanner, and then converted to electrical signals, which are input to a data recorder and stored in a punch card.

In the above-mentioned data storage system, black and white data read by a scanner is merely changed to electrical signals of 1 and 0 and stored in a punch card, and no consideration is given to effectively perform processing such as noise removal and compression of image data which are required by the current embroidering machine.

There has also been a system wherein, after the image processing of image data input from an image input device, the worker instructs the sewing order, sewing pitch, etc. to produce embroidering data.

In this system, however, no consideration is given to effectively perform processing such as noise removal and compression of image data, and special knowledge and technique are required for the operation by the worker. Thus there is a problem that it is not suitable for sewing machines for domestic use.

Also, for instance, U.S. Pat. No. 4,475,784 discloses a technique of mounting external storage means on the data read section of the machine main body for use as the auxiliary storage means of the machine.

SUMMARY OF THE INVENTION

The present invention is characterized by comprising an image data storage section for storing image data read in by an image input device, an extracting section for extracting check bit data of one or more bits from the image data, and extracting the surrounding bit data of the extracted check bit data, a color judging section for judging whether the surrounding bit data has the same color, and a data conversion section for converting the check bit data to the same color if the surrounding bit data is determined to be of the same color and for leaving the check bit data as it is if determined not to be of the same color.

Also, the present invention is characterized by comprising an image data storage section for storing image data input from an image input device, a calculating section for calculating the ratio of the number of bits of the whole image data of n (a positive integer) lines to the number of black or white bits contained therein, and determining the number of compression reference bits corresponding to the ratio, an extraction section for extracting a compression bit group of a plurality of bits from the image data stored in the image data storage section and a compression section for comparing the number of black or white bits in the compression bit group with the number of compression reference bits and compressing the compression bit group to a black or white bit.

Further, the present invention is characterized by comprising image data storage section for storing image data of the original image pattern read in from image input device, a horizontal and vertical scanning section for reading out the image data in the horizontal and vertical directions, a black bit counting section for counting the number of continuous black bits from the image data read out from the image data storage section, and a black bit adding section for adding black bits so that the number of the continuous black bits equals to a predetermined number when the number of the continuous black dots is smaller than the predetermined number.

DETAILED DESCRIPTION OF THE PREFERRED EMBODIMENTS

Figure 1:
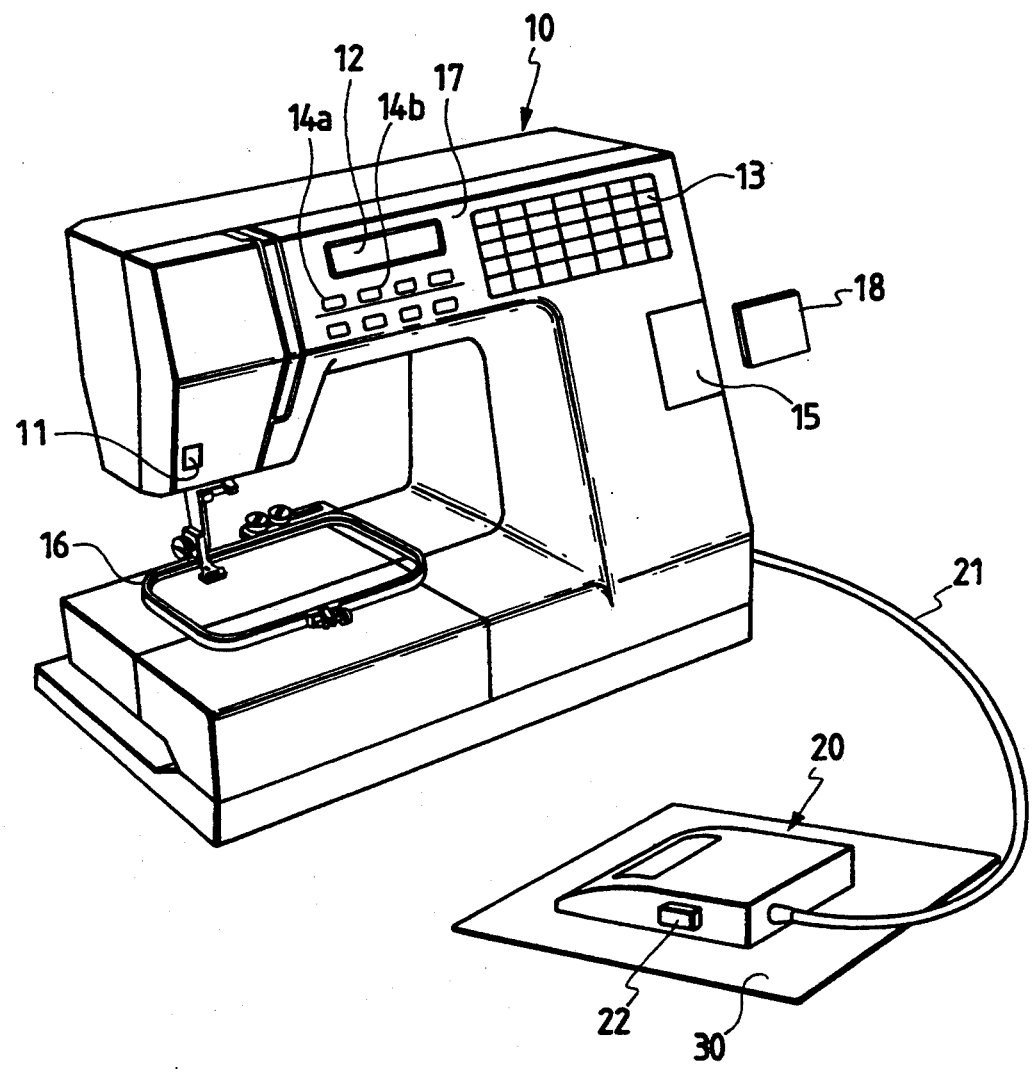
FIG. 1 is a perspective view of an example of the embroidering machine to which the present invention is applied.

In FIG. 1, numeral 10 represents an embroidering machine which enables pattern sewing by a standard needle and cloth feed and embroidery sewing wherein an embroidery frame is driven. On the front panel 17 of embroidering machine 10, there is provided a start/stop key 11 for starting and stopping the machine, a liquid crystal display 12, a pattern selecting section 13, an operation key section 14, and a card reader/writer section 15 for reading/writing data from/to RAM card.

Numeral 16 is an embroidery frame for holding embroidery cloth, and the embroidery frame 16 is detachably fixed to a carriage which is driven by X-Y driver means, not shown, in the X-axis and Y-axis directions.

The construction of the embroidery frame 16 driver is described in Japanese Patent Application No. 134217/1990 filed by the present applicant, and thus explanation thereof is omitted.

The operation key section 14 includes image scanner input mode key 14a, embroidering data conversion key 14b for instructing conversion of the original image data, read in from the original image input device described later, to embroidering data, and the like. A message for instructing the operator on the machine operation procedure, the original image data read in from the original image input device, and the like, are displayed on the liquid crystal display 12.

An image scanner 20 is an example of the original image input device, and read start button 22 is provided in a side thereof. The image scanner 20 is electrically and mechanically connected to embroidering machine 10 via dedicated cable 21 and a plug, not shown.

Numeral 30 is a sheet of preferably white paper on which an original image pattern is drawn. On the paper 30, an original image pattern of characters, pictures, etc. having a line width of 1 mm or thicker is drawn with a black pen, or the like.

The image scanner 20 preferably has an effective read width of 63 mm, binary tone output of black and white, and 504 main scan effective picture elements.

Figure 2:
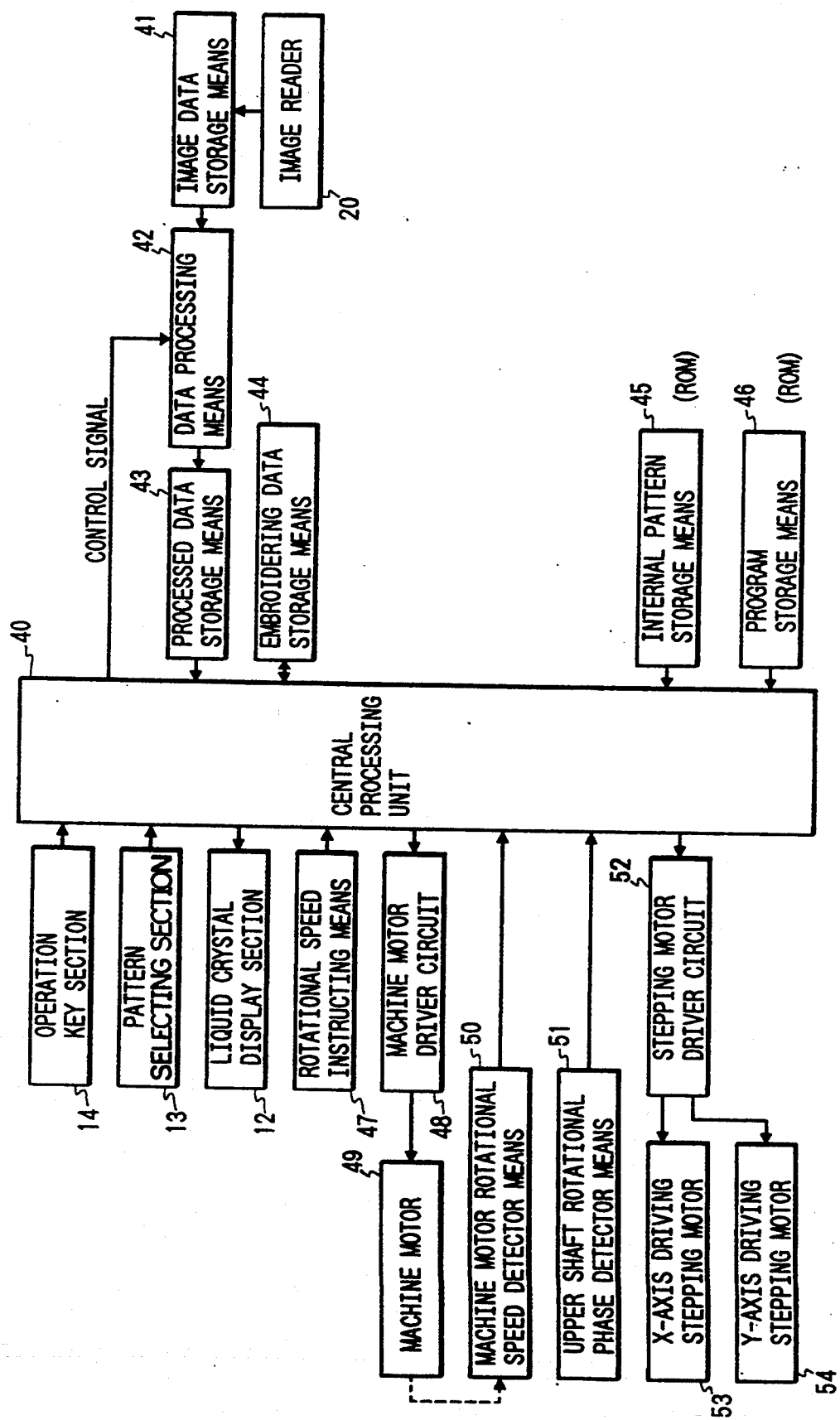
FIG. 2 is a block diagram showing the hardware configuration of to the embroidering machine.

In FIG. 2, 40 is a central processing unit for controlling the overall operation of the embroidering machine. Numeral 41 is image data storage section for storing the image data read by the image reader 20. Numeral 42 is a data processing section for performing data processing such as removal of noises from the stored image data in the image data storage section 41, and 43 is processed data storage section for storing the data processed in the data processing means 42.

Further, numeral 44 is embroidering data storage section, in which embroidering data converted by central processing unit 40 from the data stored in the processing data storage section 43 is stored. The embroidering data storage section 44 corresponds to RAM card 18 mounted on the card reader/writer section 1B.

Numeral 45 is internal pattern storage section, and 46 is program storage section. Stored in the program storage section 46 are image processing programs such as a program for controlling the data processing section 42 and a program for converting the data stored in the processed data storage section 43 to embroidering data, a control program for controlling the overall operation of the embroidering data, and a control program for controlling the overall operation of the embroidering machine 10.

In addition, 47 is a rotational speed instructing section, which corresponds to a controller, or the like, that can be freely operated by the operator. Numeral 48 is a machine motor driver circuit which operates in response to the rotational speed instructing section 47. Numeral 49 is a machine motor. Numeral 50 is machine motor's rotational speed detecting section for detecting the rotational speed of the machine motor 49. Numeral 51 is upper shaft's rotational phase detecting section for detecting the rotational phase of the upper shaft of the machine 10.

Numeral 52 is a stepping motor driver circuit for driving the embroidery frame having cloth spread thereon, 53 is an X-axis driving stepping motor which is driven by the driver circuit 52. Numeral 54 is a Y-axis driving stepping motor.

The general operation of the embroidering machine as constructed above is described below with reference to the flowchart of FIG. 3.

Figure 3:
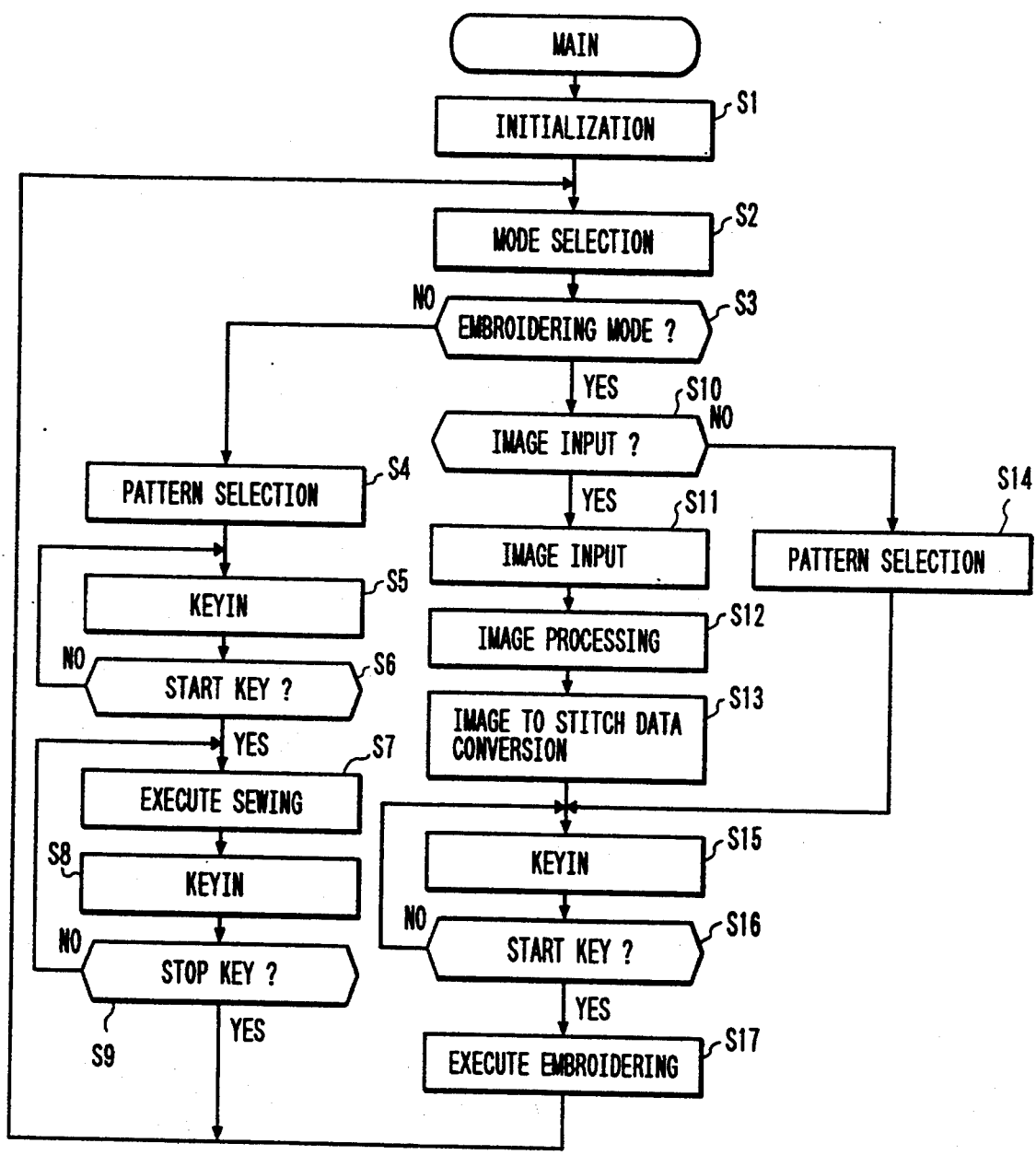
FIG. 3 is a flowchart showing the general operation of the embroidering machine.
Figure 4:
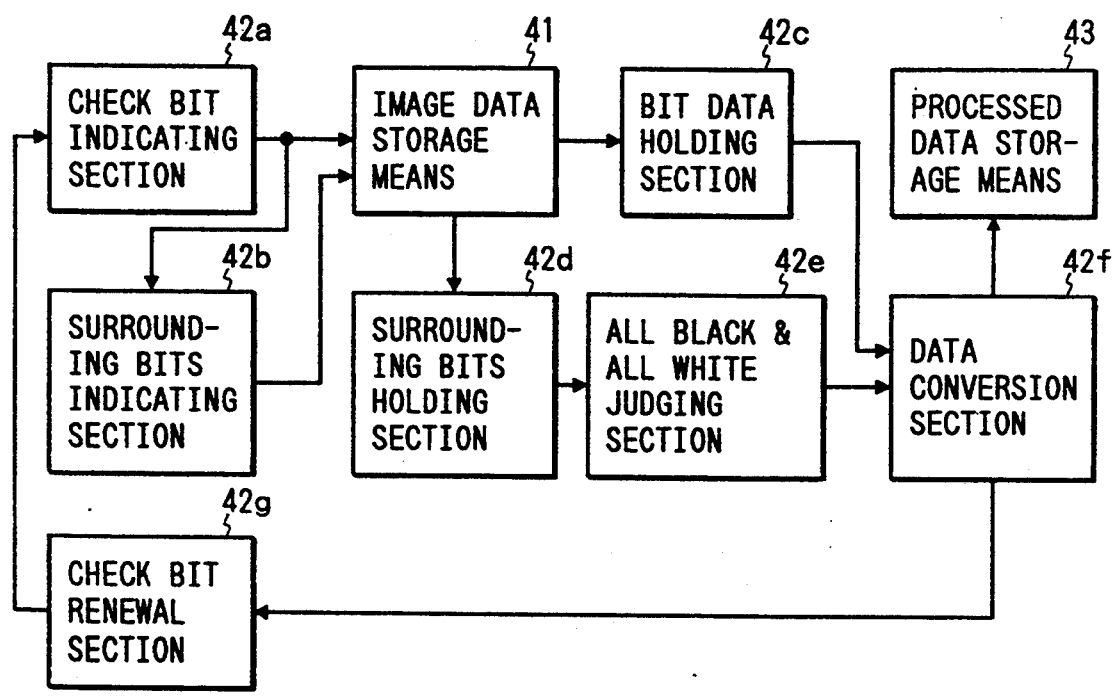
FIG. 4 is a functional block diagram of the the flow chart of FIG. 5.

As shown in FIG. 3, when power is supplied to the embroidering machine 10, the machine 10 is initialized (step S1). Then, when mode selection is made from the mode selector section in operation key section 14 (step S2) and normal sewing is selected (step S3 is negative), the operation goes to step S4. When, in step S4, pattern selection is performed from pattern selecting section 13, the central processing unit 40 selects sewing data for the selected pattern from the interval pattern storage section 45.

Subsequently, step S5 is entered. When the user depresses the start/stop key 11 (step S6 is positive) the central processing unit 40 responds to the detection signal from the upper shaft's rotational phase detector section 51 to read out sewing data from the internal pattern storage section 45 and supply it to the stepping motor driver circuit 52. Stepping motor driver circuit 52 drives X-axis driving stepping motor 52 and Y-axis driving stepping motor 54 on the basis of the supplied embroidering data. Sewing in the normal sewing mode is performed as described above (step S7). If there is a key in step S8 and this key is determined to be the start key 11 (step S9 is positive), the normal sewing mode is terminated.

Before supplying power to machine 10, the RAM card is set in the card reader/writer section 15. Whereupon, the machine is initialized as previously stated (step S1). Then, mode selection is performed from the mode selector means in the operation key section 14 (step S2), and if the embroidering mode is selected (step S3 is affirmative), determination is made as to whether it is image input or embroidery sewing (step S10).

If it is determined to be image input by the input from operation key section 14 (step S10 is affirmative), the machine 10 enters an image scanner input mode (step S11), and a message, for instance "Please depress the read start button of the image scanner." is displayed on the liquid crystal display section 12.

First, the user places the sheet 30 on which an original pattern is drawn on a flat surface, then image scanner 20 on the sheet, and moves the image scanner 20 from the first to the last position while depressing the read start button 22. By this operation, the original image pattern is converted to binary data, which is stored in image data storage section 41 provided in the machine.

Upon termination of the above storing of the original image pattern, the process advances to step S12, where the binary data stored in the image data storage section 41 is stripped of noises and compressed by data processing section 42 and stored in processed data storage section 43. Incidentally, the processed data storage section 43 may be the same as the image data storage section 41.

The original image data stored in the processed data storage section 43 is displayed on liquid crystal display section 12. The machine user can depresses the embroidering data conversion key in the operation key 14 and that the input data contains no noise and thus the original data has successfully been input from the characters or pictures displayed on liquid crystal display section 12. Embroidering data is generated by the image processing program stored in the program storage section 46 and stored in embroidering data storage section 44, or the RAM card (step S13).

Thus, the original image pattern read from image reader 20 is converted to embroidering data and stored in RAM card.

To embroider characters or pictures stored in a RAM card in this way, the start/stop key 11 is turned on (step S16 is affirmative) by keying (step S15). Whereupon the embroidering data is read out from the RAM card, and stepping motor driver circuit 52 drives the X-axis and Y-axis driving stepping motors 53 and 54 (step S17).

When the procedure flows from step S10 to step S14, selection of an embroidering pattern is performed from the pattern selecting section 13. If the start/stop key is turned on (step S16 is affirmative), the procedure goes to step S17 where the sewing of the embroidery pattern is executed.

In the embroidering machine 10 having the configuration as described above and operating as described above, a first embodiment of the present invention is characterized by removing noise from original image data (step S12).

Numerals 42a to 52g show the functions of the data processing section 42, in which 42a is a check bit indicating section for indicating a check bit to image data storage section 41, and 42b is surrounding bit indicating section for indicating the surrounding bits above, below, left and right of the check bit. Further, numeral 42c is bit data holding section for holding the bit data indicated by the check bit indicating section 42a. Numeral 42d is a surrounding bit data holding section for holding the surrounding bit data indicated by the surrounding bit indicating section 42b. Numeral 42e is an all black and all white judging section for judging the surrounding bit data is all black or white. Numeral 42f is a data conversion section for changing the check bit to a black bit when all black is judged by the all black and all white judging section 42e and to a white bit when all white is judged. Numeral 42g is a check bit renewal section for selecting the next bit when conversion of the check bit is terminated.

Figure 5:
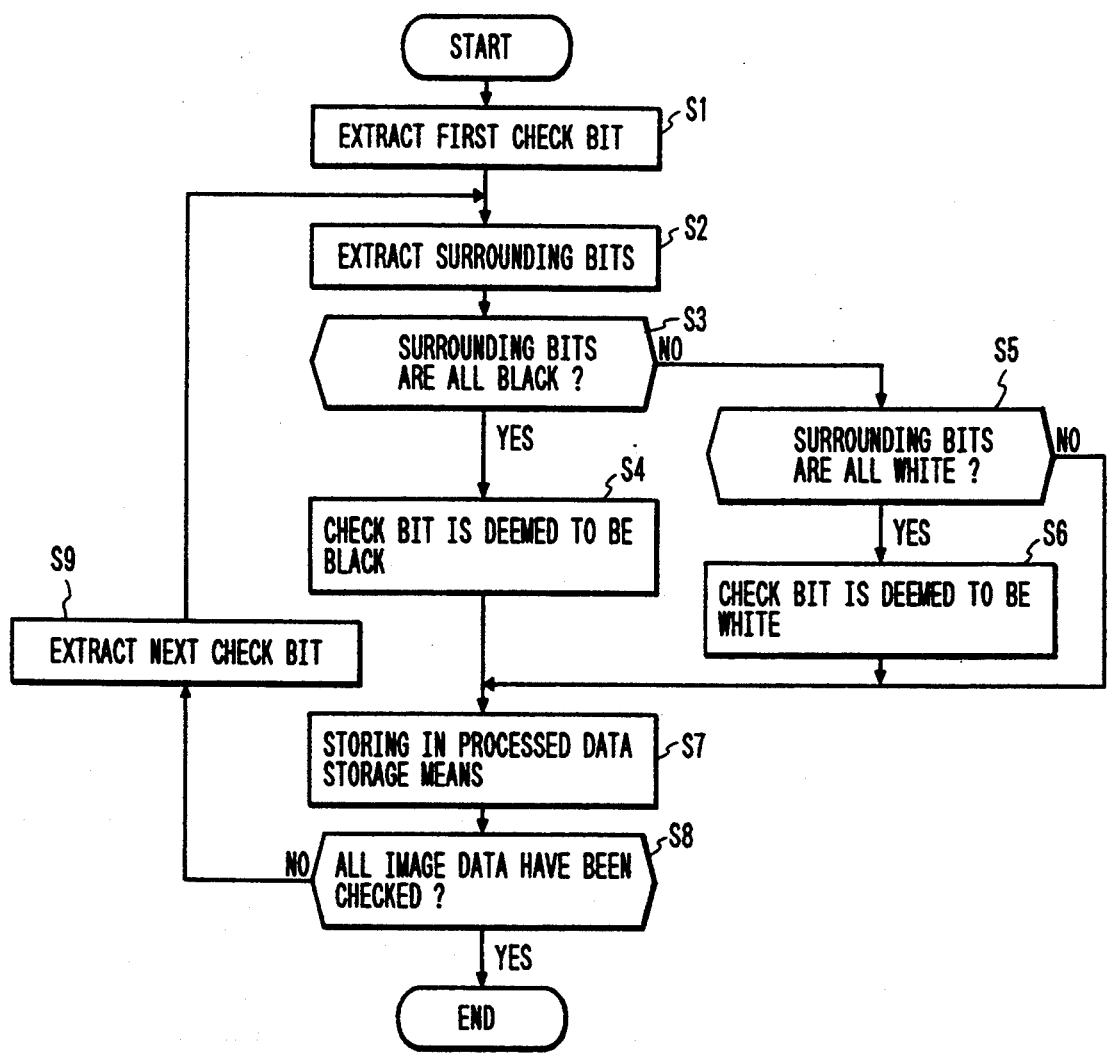
FIG. 5 is a flowchart for explaining the operation of the first embodiment.

With reference to FIG. 5, the first check bit first is extracted from image data stored in image data storage section 41 by the function of the check bit indicating section 42a (step S1). Then, the surrounding bits of the check bit are obtained in surrounding bit indicating section 42b, and the surrounding bits are extracted from image data stored in image data storage section 41 (step S2).

For instance, in the specific example of FIG. 5, if the white bit surrounded by a dark square in (a) of the same figure is assumed to be a check bit, the four black bits above, below, left and right thereof are the surrounding bits selected in the step S2.

In step S3, whether the surrounding bits are all black or white is judged by the action of all black and all white judging section 42e. If the judgment is affirmative, the process goes to step S4 where the check bit is deemed to be black. If step S3 is negative, the process goes to step S5 where it is judged whether the surrounding bits are all white. If the judgment is affirmative, the process advances to step S6 where the check bit is deemed to be white. The bit data deemed to be black in step S4 or white in step S5 is stored in the processed data storage section 43. The processes of the steps S4 and S6 are performed in the data conversion section 42f.

Subsequently, it is judged in step S8 whether all the image data in image data storage section 41 have been checked, and if the judgment is negative, the process goes to step S9 where the next check bit is extracted. A process similar to the foregoing is repeated again from step S2.

By the above operation, if it is judged that all the image data in the image data storage section 41 have been checked (step S8 is affirmative), all processing is terminated.

Figure 6:
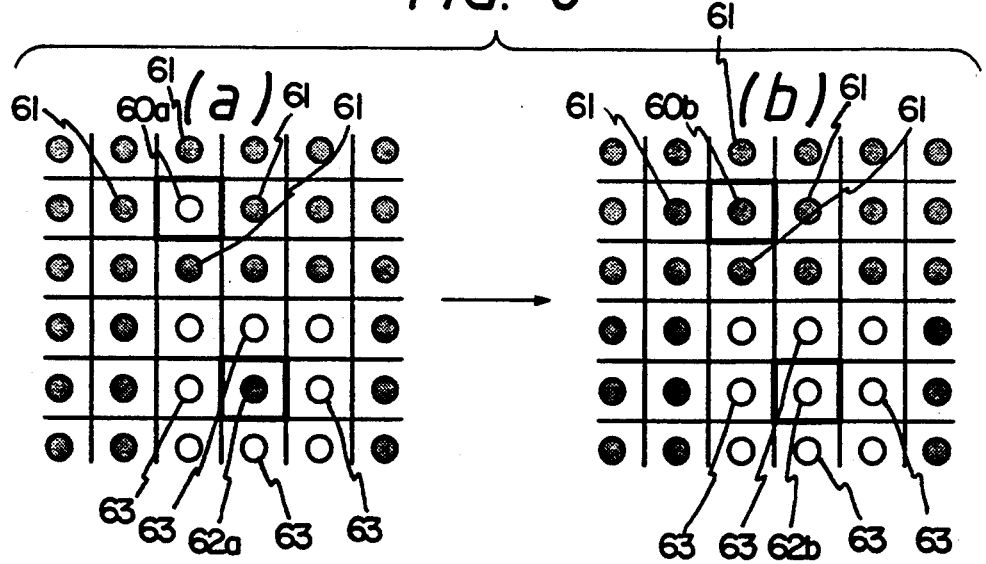
FIG. 6 is a specific explanatory view of the operation of the low chart of FIG. 5.

FIG. 6 shows an original image as represented by a series of bits. In accordance with this embodiment, if a check bit is white 60a and the surrounding bits above, below, left and right thereof 61 are all black as shown in FIG. 6(a), the check bit is converted to black 60b, as shown in FIG. 6b. If, conversely, the check bit is black 62a and the surrounding bits above, below, left and right thereof 63 are all white, the check bit is converted to white 62b, as shown in FIG. 6b.

If the surrounding bits 61, 63 are of the same color and the check bit 60a, 62a is of the other color, the probability of the check bit 60a, 62a being noise is high, and the noise can effectively be removed in accordance with the embodiment. As a result, since noise is eliminated if embroidering data is produced using the image data processed by this embodiment, in the black region of the original image pattern, embroidery is formed by an embroidery thread extending from the start point to the end point with respect to the horizontal direction and the embroidery thread is not located in the white region of the original image pattern, so that a beautiful embroidery pattern can be obtained.

Figure 17A:
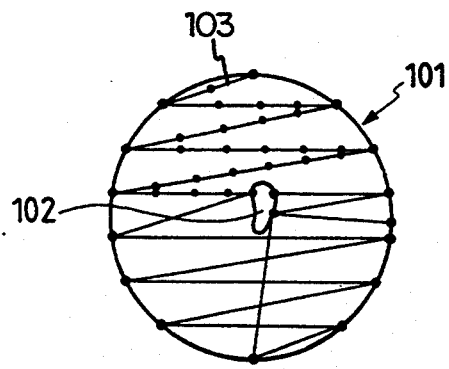
FIGS. 17A and 17B are explanatory views of the effect of the first and second embodiments.
Figure 17B:
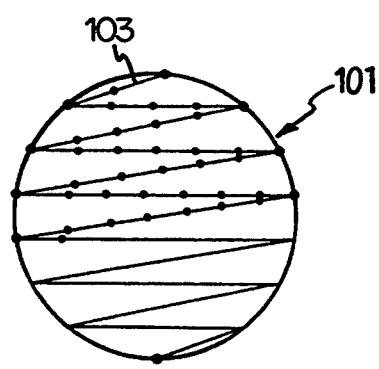

For instance, as shown in FIG. 17A, if noise (white) 102 exists in all-black circular original image pattern 101, the embroidery thread 103 is made to return at the noise 102 as shown, but, in accordance with this embodiment, this noise 102 can be removed, and thus embroidery can be formed by the embroidery thread 103 continuously extending in the horizontal direction from the start point to the end point of original image pattern 101, as shown in FIG. 17B.

Figure 7:
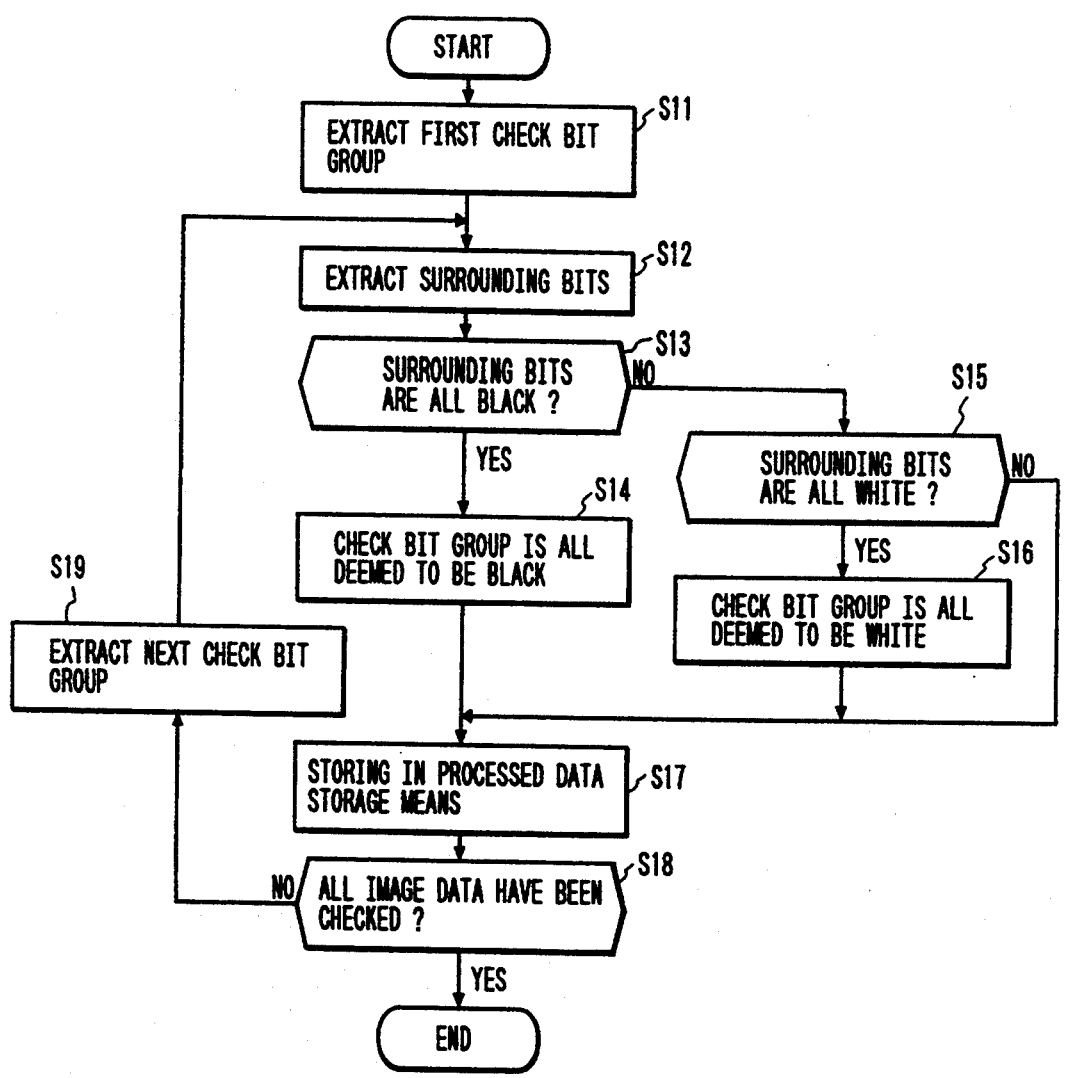
FIG. 7 is a flowchart for explaining the operation of the second embodiment of the present invention.

The second embodiment of the present invention is described below with reference to FIG. 7. This embodiment is different from the first embodiment in that the check bit is replaced by a check bit group of a plurality of bits.

In step S11, a check bit group of, for instance, four bits is extracted as shown in FIG. 8(a). In step S12, the surrounding bits above, below, left and right of the check bit group are extracted. The surrounding bits are eight in the example shown.

In step S13, it is judged whether the surrounding bits are all black, and if this judgment is affirmative, the process goes to step S14 where the check bit group is all converted to black. In step S15, it is judged whether the surrounding bits are all white, and if the judgment is affirmative, the check bit group is all converted to white. If step S15 is negative, the surrounding bits are stored in processed data storage section 43 as the original data without undergoing any conversion.

In step S18, it is judged whether all the image data in image data storage section 41 have been checked, and if the judgment is negative, the process advances to step S19 where the next check bit group is selected. Again returning to step S12, an operation similar to the foregoing is repeated. If the above operations are repeated and the judgment in step S18 becomes affirmative, all the processing is terminated.

Figure 8:
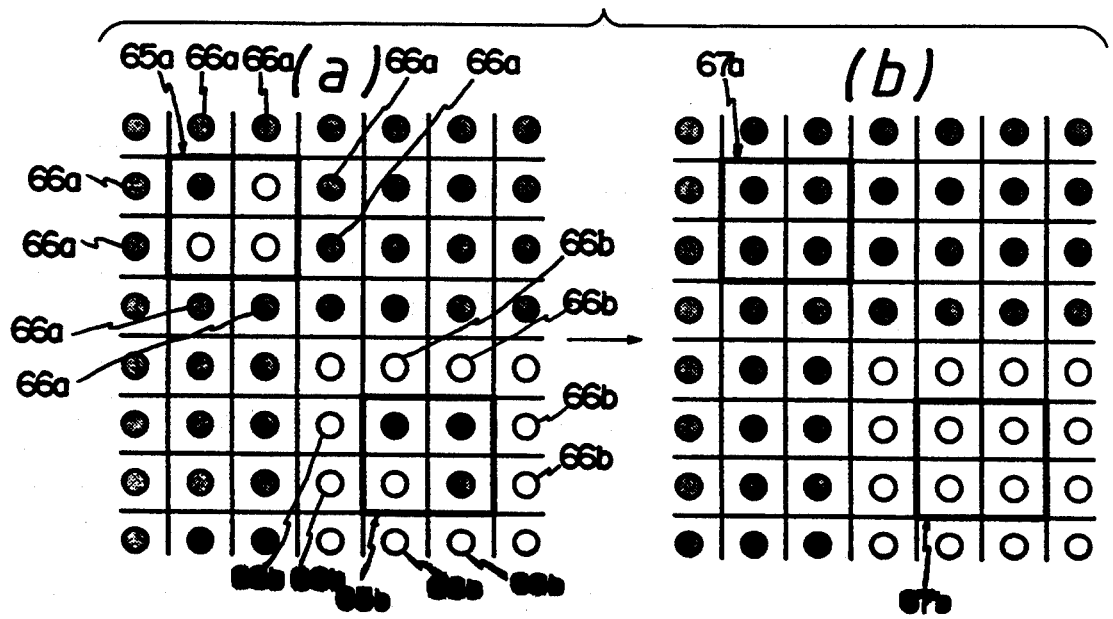
FIG. 8 is a specific explanatory view of the operation on the flow chart of FIG. 7.

FIG. 8 also shows an original image represented by bits. In accordance with this embodiment, if a check bit group 65a, 65b is not the same color as the surrounding bits 66a, 66b, the check bit group 65a, 65b is converted. The check bit groups 65a, 65b of FIG. 8(a) are converted to the check bit groups 67a, 67b of 8b. In general, the distance between dots of image data is usually in the order of 0.5 mm, and it is difficult to express a space not greater than 1 mm with a stitch when an embroidery stitch is formed. Accordingly, if image data is processed on a check bit group basis as in this embodiment, it is possible to remove data which is difficult to express, whereby embroidery data can be obtained which provides for natural embroidery sewing.

Incidentally, in the above described two embodiments, the image data extracted in steps S1 and S11 may have been subjected to a compression processing. Also, the image data stored in the processed data storage section in steps S7 and S17 may be subjected to the compression processing.

In accordance with the first and second embodiments, there is an effect that the noise can effectively removed when an original image pattern is read in by the image input device. In addition, since it is possible to remove data which is difficult to express by an embroidery stitch, embroidering data providing for natural embroidery sewing can be produced.

The third embodiment of the present invention is now described. In the image processing in step S12 of FIG. 3, rather than simply thinning out image data for compression, on the basis of the degree of white or black of the image data, a bit group of a plurality of bits is compressed to one bit of black or white.

Figure 9:
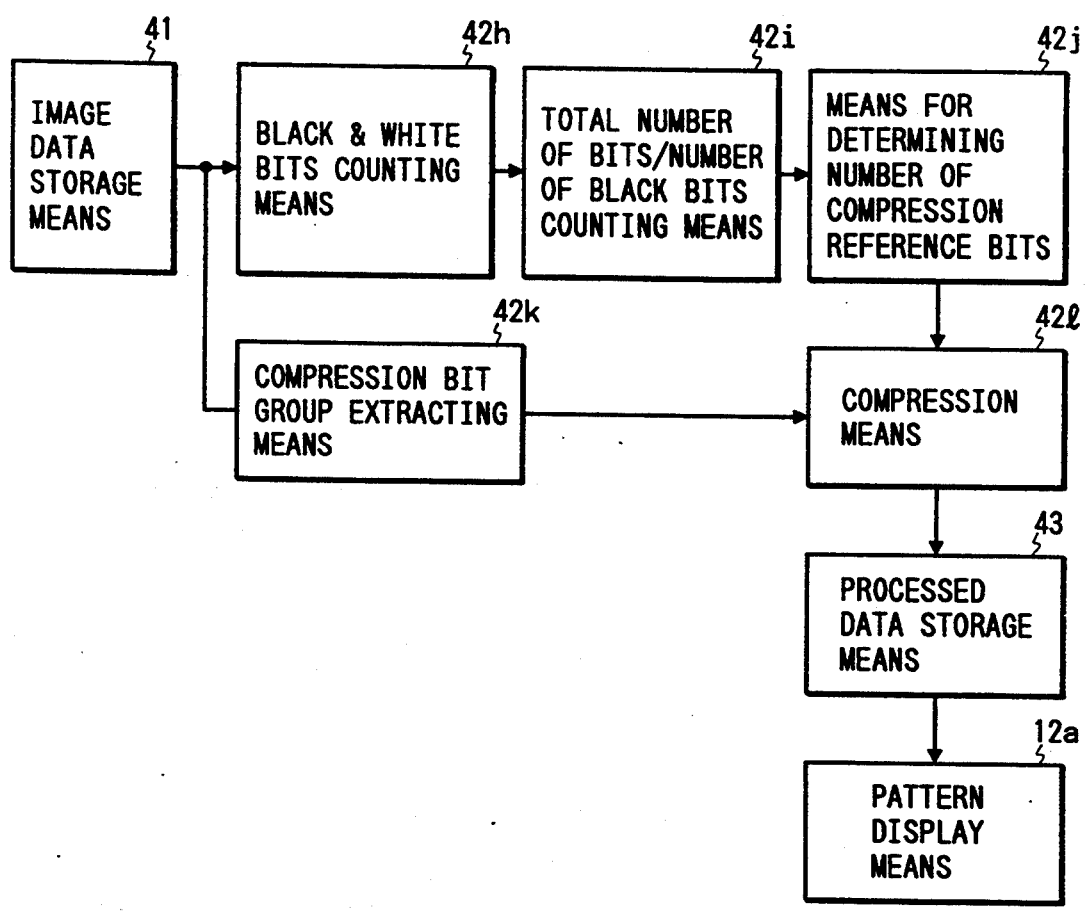
FIG. 9 is a functional block diagram of the the flow chart of FIG. 12.

FIG. 9 shows the the third embodiment of the present invention. Numerals 42h to 42l represent the functions of the data processing section 42, and numeral 42h is white and black bits counting means for counting the respective numbers of white and black bits from the image data of an embroidery pattern stored in image data storage section 41. Numeral 42i is total number of black bits calculating section for calculating the ratio of the number of total bits, a total of white and black bits, with the black bits counted in the white and black bits counting section, numeral 42j is a number of compression reference bits determination section for determining the number of compression reference bits from the value of the total number of bits/number of black bits.

For example, if the amount (%) of black bits/total bits is 25% or less, that is, image data is generally whitish, the number of reference compression bits determination section 42j determines that the number of compression reference bits=4 if one bit group is of four bits. If the amount (%) of black bits/total bits is between 25% and 50%, that is, image data is rather whitish, it is determined that the number of compression reference bits=3. Further, if the value (%) of black bits/total bits is between 50% and 75%, that is, image data is blackish, it is determined that the number of compression reference bits=2. Also, if the value (%) of black bits/total bits is greater than 76%, then the compression reference number is 1.

Figure 10:
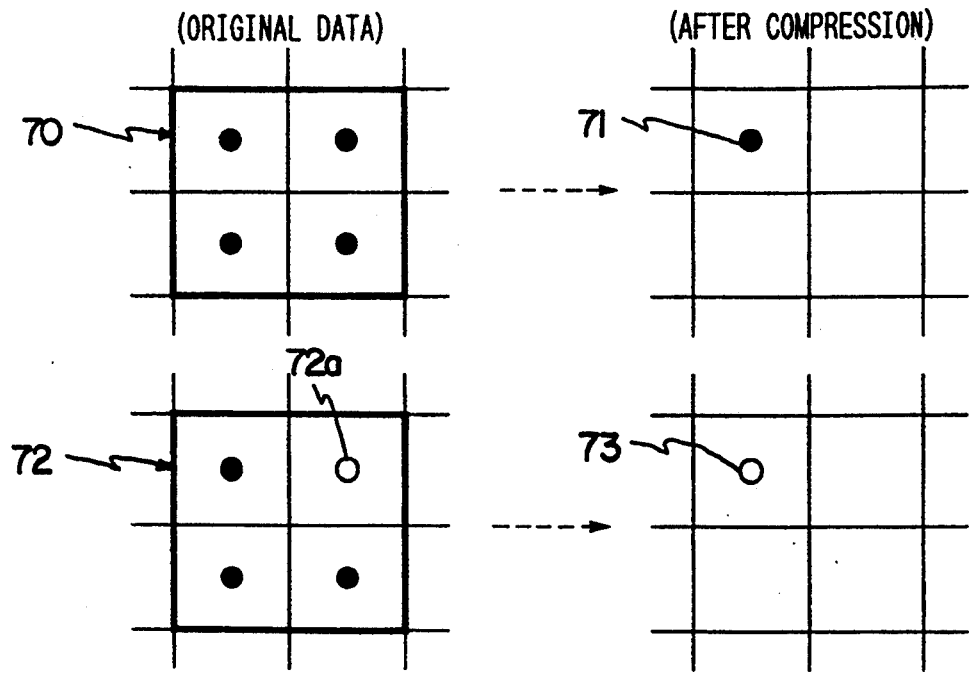
FIGS. 10 and 11 are explanatory views of example data obtained by the compression operation of the third embodiment.

The number of compression reference bits represents a threshold value of whether one bit group, for instance, one bit group of four bits, is to be compressed to one bit of black or one bit of white. As shown in FIG. 10, if the number of compression reference bits=4, one bit group 70 is compressed to one bit of black 71 when the four bits in the one bit group 70 are all black bits, and if even one white bit 72a is included in the four bits of a one bit group 72 and the number of black bits is less than four, the one bit group 72 is compressed to one bit of white 73.

Figure 11:
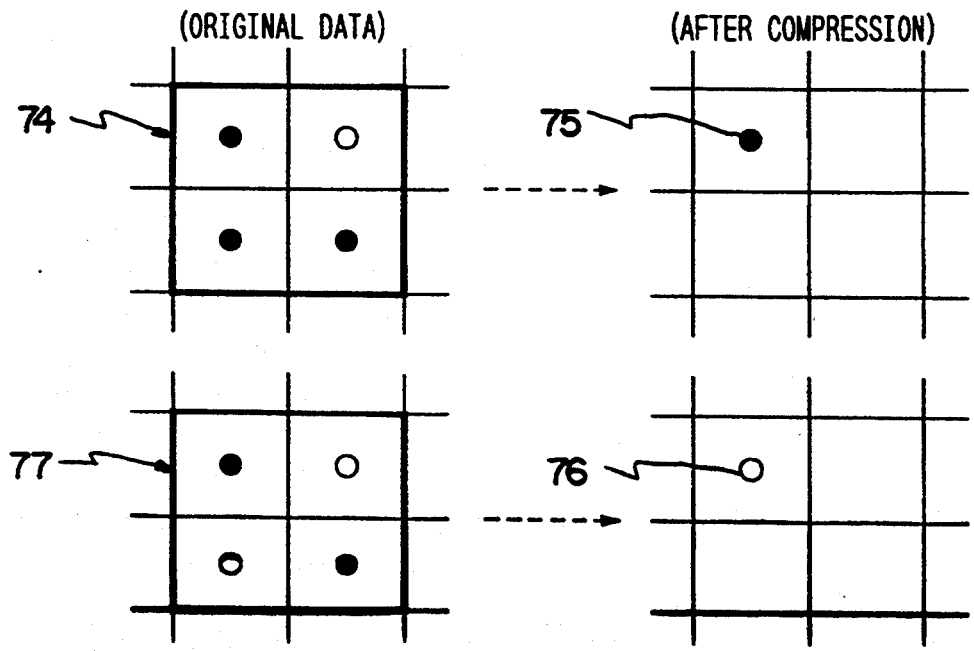

In addition, as shown in FIG. 11 if the number of compression reference bits=3, a bit group 74 is compressed to one bit of black 75 if three or more bits of four bits within the bit group 74 are black and to one bit of white 76 if less than three bits are black in a bit group 77.

Again returning to FIG. 9, 42k is compression bit group extracting section for extracting compression bit groups one by one. Although one bit group consists of four bits in the above example, the present invention is not limited to this and it can consists of six, eight, nine or other number of bits. Numeral 42l is compression section for compressing the compression bit group to one bit of black if the number of black bits in the compression bit group is equal to or greater than the number of compression reference bits, and to one bit of white if the number of black bits is less than the number of compression reference bits.

Figure 12:
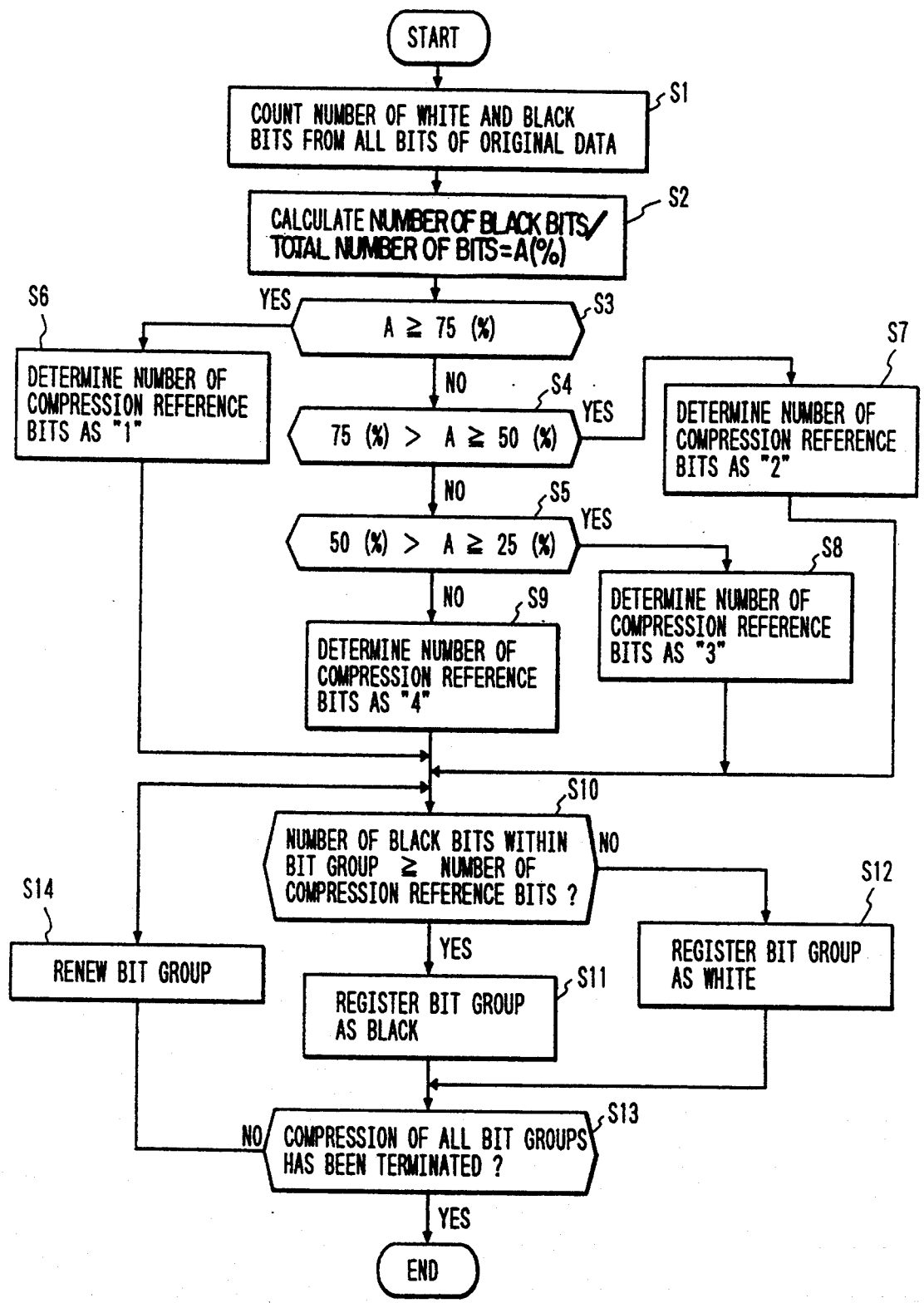
FIG. 12 is a flowchart for explaining the operation of the third embodiment.

As shown in FIG. 12, the white and black bits counting section 42h counts the respective number of white and black bits from the image data of the original image pattern such as a design or characters stored in image data storage section 41 (step S1). Upon termination of the count, the process goes to step S2 where the total number of bits/number of black bits calculating section 42j calculates the amount of the number of black bits/total number of bits (A) by an arithmetic operation.

Then, the process goes to step S3 where it is judged whether or not A≧75% is valid, and if it is affirmative, the process goes to step S6 where an operation is performed for determining the number of compression reference bits=1. If the step S3 is negative, the process goes to step S4 where it is judged whether or not 75%>A≧50% is valid. If the judgment is affirmative, the process advances to step S7 where the number of compression reference bits=2 is determined.

If the judgment in the step S4 is negative, the process goes to step S5 where it is judged whether 50%>A≧25% is valid. If the judgment is affirmative, the process advances to step S8 where the number of compression reference bits=3 is determined else the process advances to step S9 where the number of compression reference bits=4 is determined.

When the number of compression reference bits is determined as described above, the process goes to step S10 where the operation of compression is executed by the compression section 42l. That is, if the number of black bits in a bit group is equal to or greater than the number of compression reference bits (step S10 is affirmative), the process goes to step S11 to register the bit group as one bit of black, and if the number of black bits in a bit group is smaller than the number of compression reference bits (step S10 is negative), the process goes to step S12 to register the bit group as one bit of white.

Subsequently, it is judged whether or not the compression of all the bit groups of original data has been terminated (step S13), and if the judgment is negative, the process goes to step S14 where a new bit group is selected. Thereafter, returning to step S10, the compression operation is repeated for the updated bit group.

As described above, in accordance with this embodiment, it is judged whether image data generally has a tendency of white or black and the number of compression reference bits is determined according to the tendency, so that noise can effectively be removed from the image data. As a result, the data is compressed, and a pattern expressed on the pattern display means 12a according to the data is smoothly expressed. For instance, a figure of straight lines are expressed more smoothly.

The fourth embodiment is different from the third embodiment in the following point: In the third embodiment, the total number of bits/number of black bits/total number of bits (A) is calculated for all the image data of the original pattern to determine the number of compression reference bits, whereas in the fourth embodiment, the number of black bits/total number of bits (B) is calculated from n lines where n is a selected number of the image data to determine the number of compression reference bits.

Figure 13:
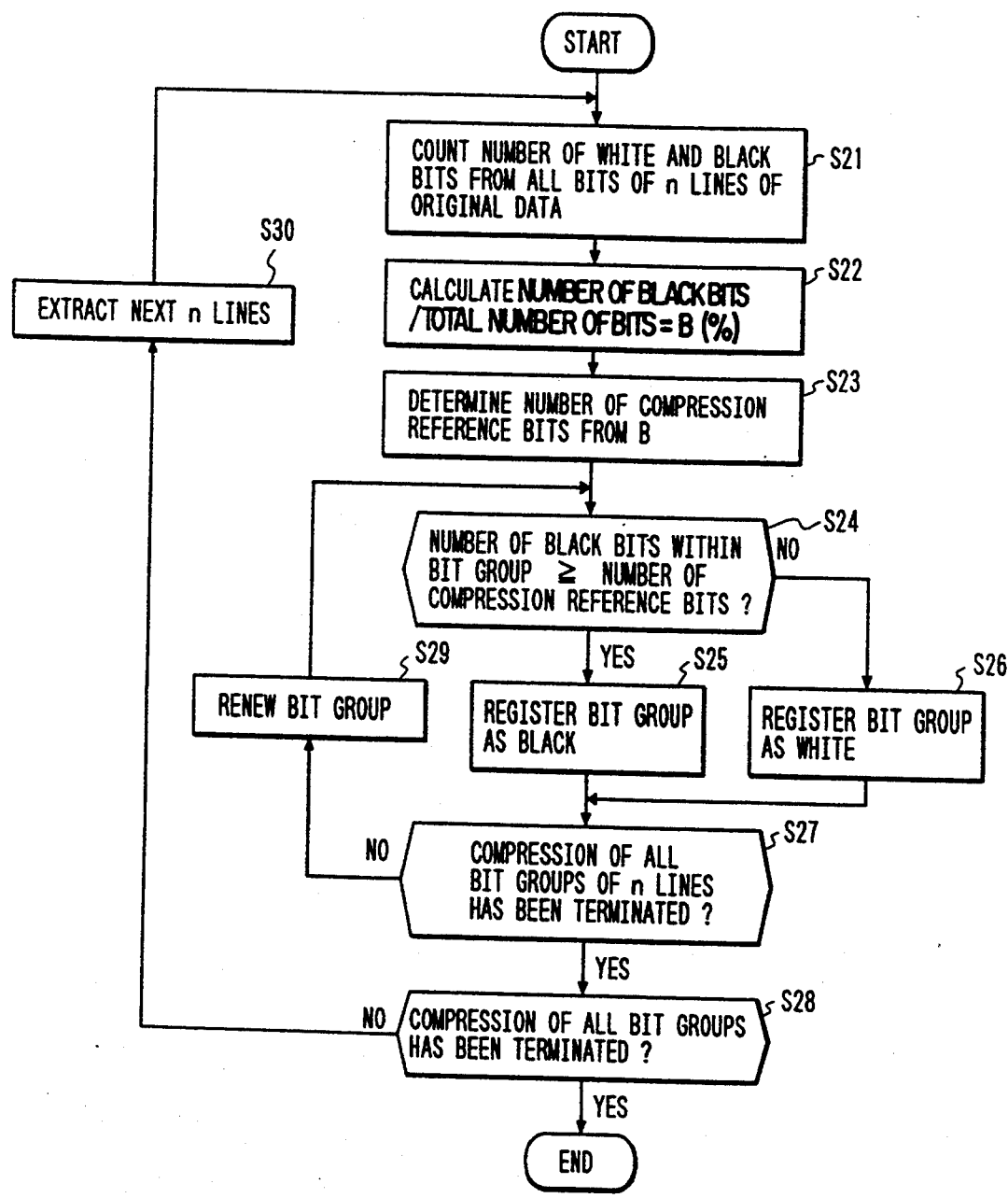
FIG. 13 is a flowchart for explaining the operation of the fourth embodiment of the present invention.

In the flowchart of FIG. 13, the number of white and black bits of all the bits in the n lines are counted in step S21. In step S22, the number of black bits/total number of bits in the n lines (B) is calculated, and in step S23, the number of compression reference bits is determined from B by an operation similar to steps S3 and S9.

Subsequently, the process goes to step S24 wherein the number of black bits in the bit group is compared with the number of compression reference bits. If the former is equal to or greater than the latter, the process goes to step S25 where the bit group is registered as one bit of black, and if the former is smaller than the latter, the process goes to step S26 where the bit group is registered as one bit of white.

In step S27, it is judged whether or not the compression of all the bit groups of the n lines have been terminated, and if negative, the process goes to step S29 where on operation for bit group renewal is performed. Then, returning to the step S24, the compression of the next bit group is performed.

When the compression of the n lines is terminated in this manner, the step S27 becomes affirmative and the process advances to step S28. In step S28, it is judged whether the compression of all the bit groups has been terminated, and if negative, the process advances to step S30 to extract the next n lines. Returning to step S21, an operation similar to the foregoing is iterated for the n lines.

If the compression of all the bit groups of the original image pattern is completed by the above operations, the judgment in step S28 becomes affirmative and the compression processing for all the image data has been completed.

In accordance with this embodiment, because the tendency of degree of white or black of image data is grasped for n lines and compression can be performed on the basis of this, the noises of image data can effectively removed as in the first embodiment and data after compressed can be stored noise-free.

Although, in the above described embodiments, the number of compression reference bits is calculated from the number of black bits/total number of bits, the present invention is not limited to this and the number of compression reference bits may of course be calculated from the number of white bits/total number of bits or the number of black bits/number of white bits.

As described above, in accordance with the third and fourth embodiments, rather than simply thinning out image data for compression, the degree of white or black of image data is determined, and based on this, it is judged whether a bit group of a plurality of bits is compressed to one bit of black or one bit of white, so that the noise in the image data can effectively be removed and the image data can be formed into its intended shape. This also results in smoothness to the figure displayed on the display section on the panel of the machine.

The fifth embodiment is characterized in that, in the image processing in step S12 of FIG. 3, if a figure element that is thinner than a predetermined line width exists, it is automatically corrected to embroidering data of the predetermined line width. Thus, the occurrence of cloth shrinkage after the sewing is almost prevented and noise of the image data is removed.

Figure 14:
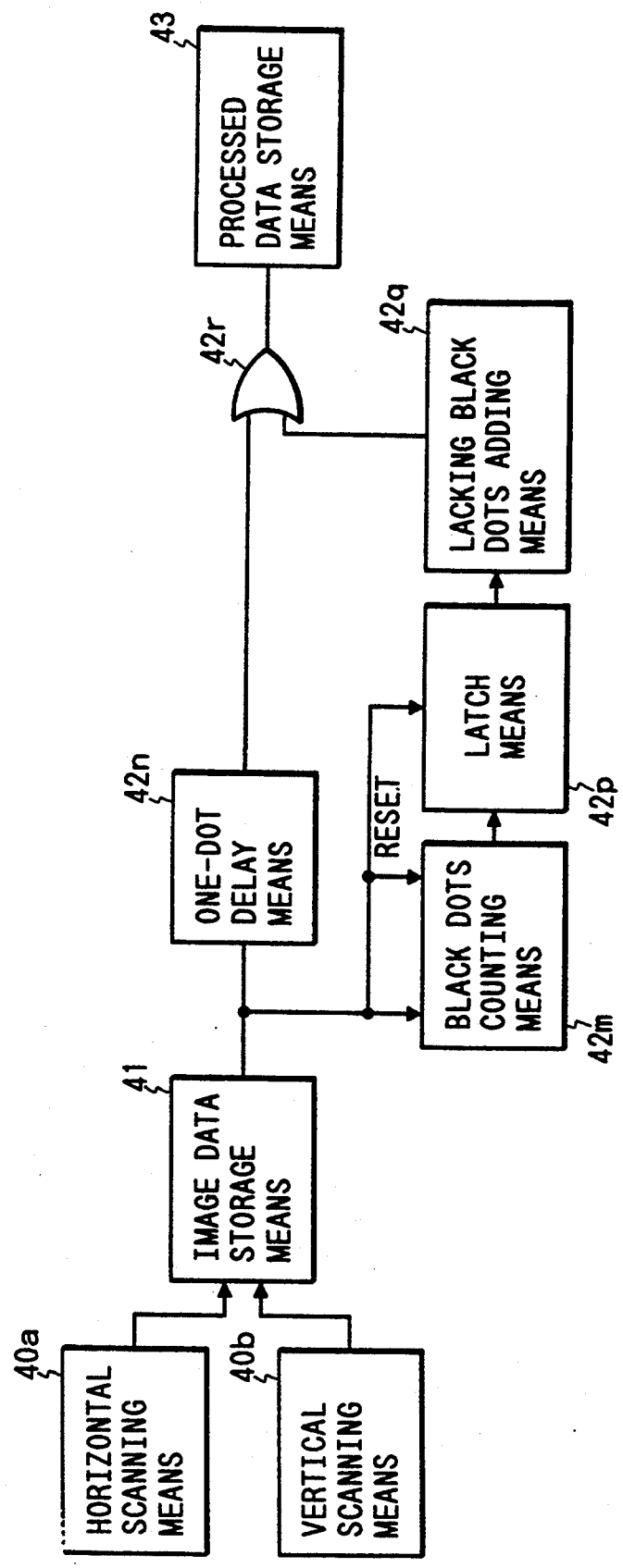
FIG. 14 is a functional block diagram of the flow chart of FIG. 13.

In FIG. 14, numeral 40a is horizontal scanner and numeral 40b is vertical scanner. Numeral 41 is image data storage section, and 42m is a black bit counter section for counting the number of black bits of image data read counter from the image data storage section 41. The black bit 42m consists of, for instance, a section, which is reset upon input of a white bit.

Numeral 42h is a one-bit delay, 42p is a latch for latching the count value of the black bit counter 42m upon input of a white bit, and 42q is bit adding section for adding bits when the number latched in the latch is one or greater. If the number of continuous black bits is predetermined to be, for instance three, the black bits adding section 42q adds the number black bits to the number of black bits latched in the 42p to make a total of three. On the other hand, if the number latched in the latch 42p is three or greater, the bits adding section 42q outputs no black bits. Numeral 42e is an OR gate.

Figure 15:
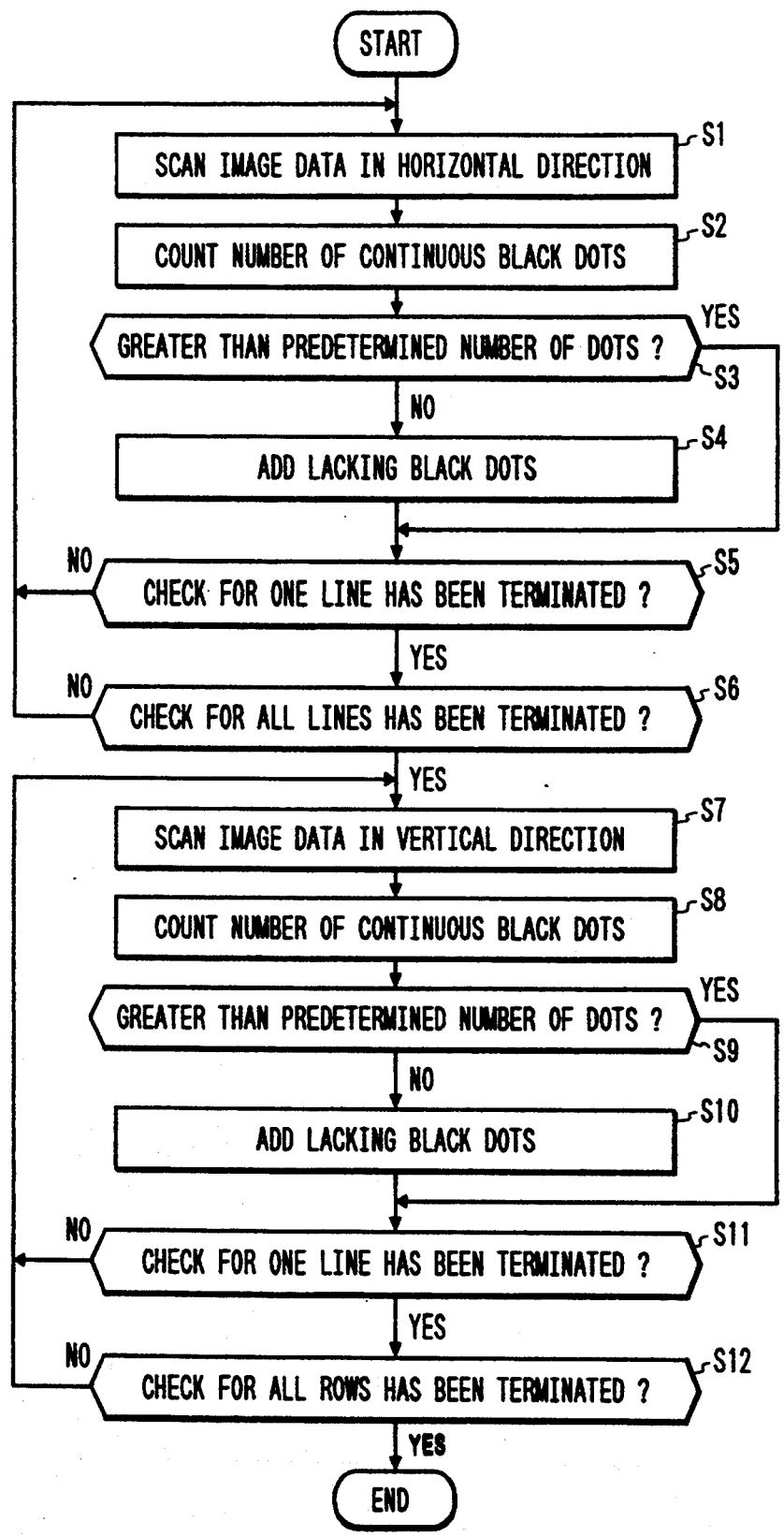
FIG. 15 is a flowchart for explaining the operation of the fifth embodiment.

As shown in FIG. 15, image data stored in image data storage section 41 is scanned by horizontal scanner 40a in the horizontal direction step S1. In step S2, the black bits counter 42m counts the number of black bits in the image data. The one-dot delay section 42n outputs the image data after delay by one bit.

In step S3, the number of continuous black bits is counted by black bit counter 42m. The black bits counter counts up when black bits continue. Thereafter, upon input of a white bit, the count value of the black bit counter 42m is latched in latch 42p and black bit counter 42m is reset.

Then, proceeding to step S3, where it is judged whether the number of black bits is equal to or greater than a predetermined number of bits (e.g. three). If the judgment is negative, the process advances to step S4 where black bits are added. On the other hand, if the judgment of the step S3 is affirmative, the process goes to step S5.

In FIG. 14, the black bits adder 42q monitors the value latched in latch 42p, and if the predetermined number is three as described above, it operates when the value of latch means 42p is 1 or 2 to output black bits to the OR gate. For instance, if the value of latch 42p is 1, it outputs two black bits, and one black bit if the value of latch 42p is 2. If the value of latch 42c is 0, or 3 or greater, it outputs no black bit.

As described above, the image data from image data storage means 41, after passing through one-bit delay 42n, is introduced into OR gate 42r, and if the number of continuous black bits is less than three, the image data is corrected by the black bits adding section 42q so that three black are stored in processed data storage section 43.

In step S5, it is judged whether the entire horizontal line has been checked, and if negative, the process returns to step S1 to repeat the process. If step S5 becomes affirmative, step S6 is entered to judge whether all the lines have been checked. If the judgment is negative, the process returns to step S1 to again execute the above described process for another horizontal line.

If step S6 becomes affirmative after the above described operation, all the image data stored in the image data storage section 41 has been processed.

Figure 16A:
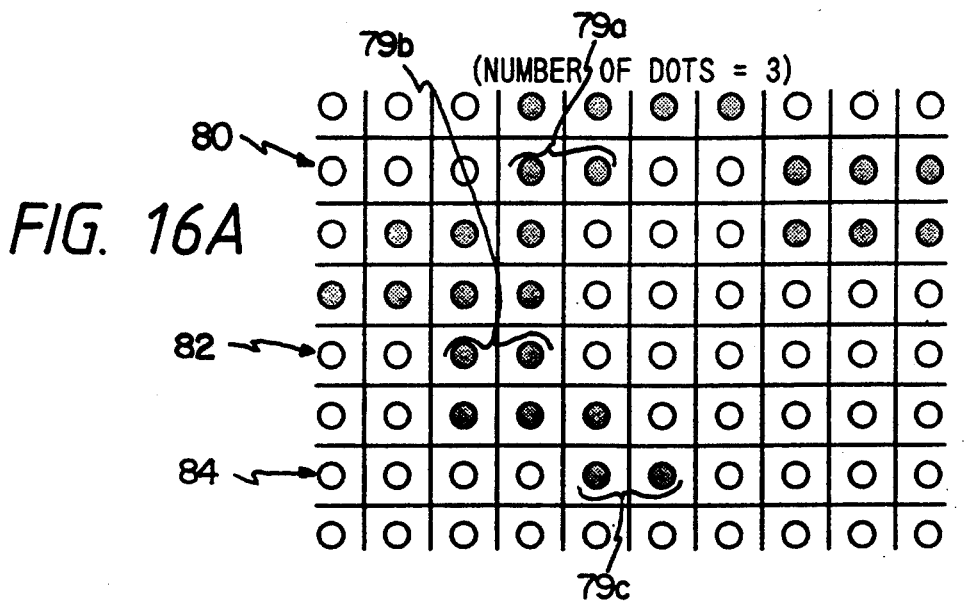
FIG. 16A, 16B, and 16C are specific explanatory views of the operation of the flow chart of FIG. 15.
Figure 16B:
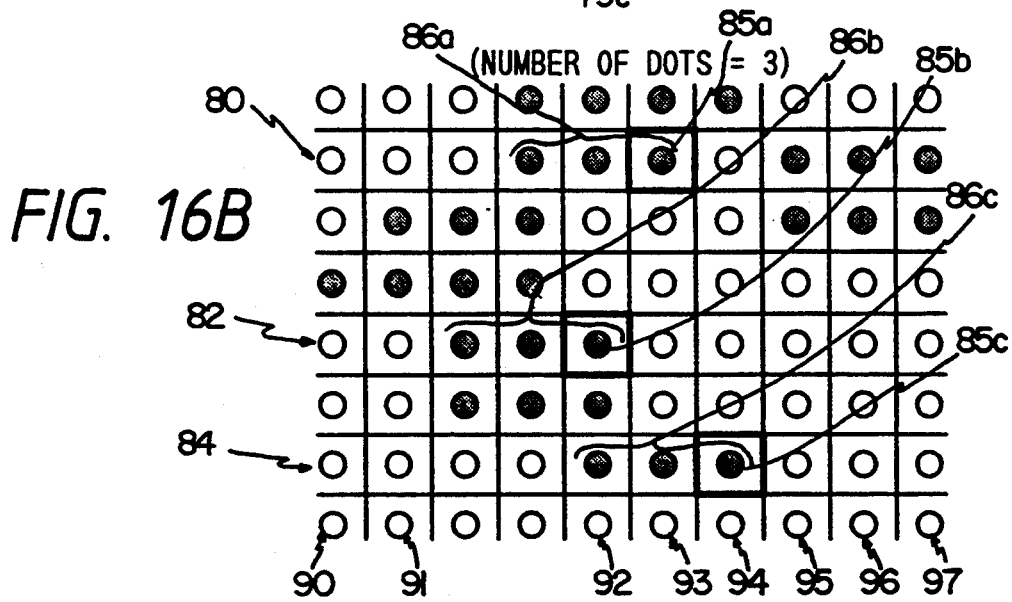

For instance, if the image data stored in the image data storage section 41 is as shown in FIG. 16A, it is converted as shown in FIG. 16B by the processing of the steps S1 to S6. The two continuous black bits 79a, 79b, 79c in the second 80, 82 fifth, and seventh lines 84 of FIG. 16A respectively are added with one black bit 85a, 85b, 85c for conversion to three continuous black bits 86a, 86b, 86c, as shown in FIG. 16B.

Returning to FIG. 15, the step S6 is followed by the process of steps S7 to S12. This process is to vertically scan the image data stored in the image data storage section 41 for performing a process similar to that described above.

In FIG. 14, using the vertical scanner 40b instead of the horizontal 40a, an operation similar to the above is performed. Thus, detailed description is omitted.

Figure 16C:
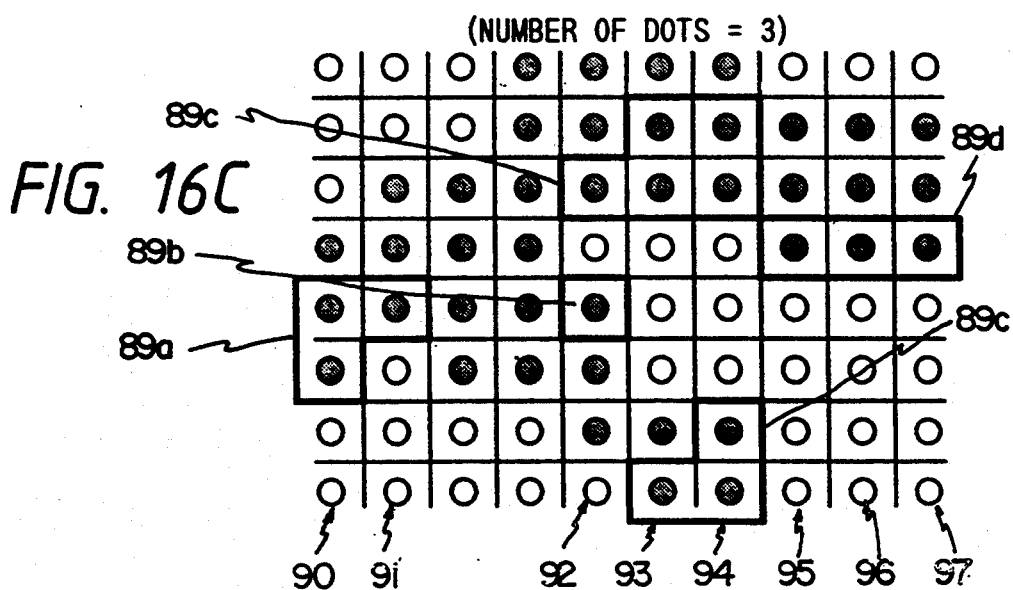

In the example of FIG. 16C, black bits 89a, 89b, 89c, 89d, 89e are added to the first 90, second 91, fifth 92, sixth 93, seventh 94, eighth 95, ninth 96 and tenth 97 columns of FIG. 16B, by which two or one black added to one or two continuous black bits, respectively, for conversion to three continuous black bits.

As described above, cloth shrinkage typically occurs if a figure element having a thin line width of one or two black bits are directly converted to sewing data and sewed, but in accordance with this embodiment, a figure element having a thin line width is automatically corrected to a line width of three bits, so that the disadvantage of cloth shrinkage in the sewing can be eliminated. This also allows the sewed pattern to closely resemble the original image pattern, whereby the embroidery pattern quality can be improved.

In addition, noise often occurs in the boundary between continuous black and white bits, but in accordance with this embodiment, the noise can effectively be absorbed in black bits and removed.

Although, in the above embodiment, the predetermined number of bits was three, the present invention can, of course, be set to four or greater. The number of bits may also be made freely selectable by the user from the panel of the machine.

Moreover, image data of a thin line width in both horizontal and vertical directions has been corrected in the invention, but shrinkage of embroidery thread can be improved over the prior art even with either one.

In accordance with the fifth embodiment, if a figure element thinner than a predetermined line width exists, it is automatically corrected to embroidery data of such line width, and thus, there is an effect that almost no cloth shrinkage occurs after the sewing. This also allows an embroidery pattern closely resembling the original image pattern to be produced, whereby the embroidery quality can be improved.

Incidentally, the above description has been made to the case that image data storage section 41, data processing section 42, processed data storage section 43 and embroidering machine main body, but the present invention is not limited to this, and they may be provided in a sewing data producting system which is separate from the embroidering machine. Description of the sewing data production system is omitted, because it is described in detail in Japanese Patent Application No. 266462/1990 by the present applicant.

What is claimed is:

1. A sewing machine having an image data processing system, a reciprocating needle, an embroidery frame holding a cloth to be embroidered thereon, and actuators proximate the reciprocating needle and connected between the embroidery frame and the sewing machine for moving the embroidery frame in x and y directions with respect to the reciprocating needle during operation, and an image data processing system comprising:
    image input means for reading an image pattern and providing an image data of the image pattern as a plurality of bits having a checkbit and at least three surrounding bits proximate the checkbit wherein each bit represents one of a plurality of colors;
    noise removal means operably connected to the image input means for eliminating noise from the image data, the noise removal means having:
      checkbit extracting means operably connected to the image input means for extracting the checkbit from the image input means;
      surrounding bit extracting means operably connected to the image input means for extracting the surrounding bits from the image input means;
      color judgment means operably connected to the surrounding bit extracting means for judging whether the surrounding bits are all equal to one of the plurality of colors;
      checkbit converting means operably connected to the color judgment means for converting the color of the checkbit to the color of the surrounding bits if the surrounding bits are all equal to one of the plurality of colors as determined by the color judgment means; and
    operating means operably connected to the noise removal means, actuators, and reciprocating needle for operating the actuators and the reciprocating needle to produce an embroidery pattern in accordance with the processed image.

2. The sewing machine of claim 1 wherein the checkbit extracting means extract a plurality of check bits from the image input means.

3. A sewing machine having an image data processing system, a reciprocating needle, an embroidery frame holding a cloth to be embroidered thereon, and actuators proximate the reciprocating needle and connected between the embroidery frame and the sewing machine for moving the embroidery frame in x and y directions with respect to the reciprocating needle during operation, the image data processing system comprising:
    image input means for reading an image pattern, for providing an image data of the image pattern as a plurality of bits wherein each bit represents either a first color or a second color, and for providing a first value representative of a quantity of bits having the first color and a second value representative of a quantity of total bits;
    ratio calculating means operably connected to the image input means for calculating a third value representative of a ratio of the first value to the second value;
    compression calculation means operably connected to the ratio calculation means for obtaining a compression reference number corresponding with the third value;
    extracting means operably connected to the image input means for extracting a bit group from the image input means;

compression means for comparing the bit group to the compression reference number to obtain a single bit color appropriate for representing the bit group and storing the single bit color as a compression image; and operating means operably connected to the compression means, the actuators, and the needle for operating the actuators and reciprocating the reciprocating needle to produce an embroidery pattern in accordance with the compression image.

4. A sewing machine having an image data processing system, a reciprocating needle, an embroidery frame holding a cloth to be embroidered thereon, and actuators proximate the reciprocating needle and connected between the embroidery frame and the sewing machine for moving the embroidery frame in x and y directions with respect to the reciprocating needle during operation, the image data processing system comprising:

image input means for reading an image pattern and providing an image data of the image pattern as a plurality of bits wherein each bit represents either a first color or a second color;

scanning means, operably connected to the image input means, for reading the image data in a selected direction;

counting means operably connected to the scanning means for counting a quantity of continuous bits of the first color to determine whether the quantity of continuous bits of the first color is less than a selected number;

filling means for changing a bit representing a second color to the first color if the quantity of continuous bits of the first color is less than the selected number so that the quantity of continuous bits of the first color equals the selected number and storing the bit as a processed image; and operating means operably connected to the filling means, actuators, and the reciprocating needle for operating the actuators and the reciprocating needle to produce an embroidery pattern in accordance with the processed image.

* * * * *